United States Patent [19]

Eschwey et al.

[11] Patent Number: 4,869,859
[45] Date of Patent: Sep. 26, 1989

[54] PROCESS FOR THE PRODUCTION OF FLUORINATED SURFACES OF POLYMERS

[75] Inventors: Manfred Eschwey, Dusseldorf; Rolf van Bonn, Duisburg; Horst Neumann, Kelkheim, all of Fed. Rep. of Germany

[73] Assignee: Messer. Griesheim GmbH, Fed. Rep. of Germany

[21] Appl. No.: 123,562

[22] Filed: Nov. 20, 1987

[30] Foreign Application Priority Data

Dec. 1, 1986 [DE] Fed. Rep. of Germany ....... 3640975

[51] Int. Cl.$^4$ ...................... B29C 49/46; B29C 49/18; B29C 49/66
[52] U.S. Cl. .................................... 264/83; 264/526; 264/528; 264/529
[58] Field of Search .................. 264/83, 526, 529, 528

[56] References Cited

U.S. PATENT DOCUMENTS 4,617,077 10/1986 Giese et al. ........................... 264/83

FOREIGN PATENT DOCUMENTS 2644508 6/1978 Fed. Rep. of Germany .

Primary Examiner—Jan H. Silbaugh
Assistant Examiner—Neil M. McCarthy
Attorney, Agent, or Firm—Connolly & Hutz

[57] ABSTRACT

A process for blow molding and fluorination of a hollow thermoplastic article includes bringing a blank to rest against the inside wall of the blow mold as a result of introducing an inert blow gas. An inert gas/reaction mixture is then introduced in the hollow article for fluorinating the inside surface of the hollow article. After the inside surface of the hollow article has cooled off, the inert gas/reaction gas mixture is blown in below the melting point of the thermoplastic material.

3 Claims, 2 Drawing Sheets 10,000X 10,000X 10,000X 10,000X

PROCESS FOR THE PRODUCTION OF FLUORINATED SURFACES OF POLYMERS

BACKGROUND OF INVENTION

The invention relates to a process for the production of hollow articles having fluorinated inside surfaces consisting of thermoplastic materials. In addition to HDPE, also IDPE, PP, EPDM, PVC and similar materials are suitable as thermoplastic materials.

In the automobile industry, fuel containers are increasingly produced from polymers, in particular, from high pressure polyethylene. These plastic fuel containers are lighter and cheaper than the conventional containers made from sheet steel.

Moreover, they can be made without problems in a complicated shape so that the available space can be better utilized and the container volume can be increased.

Plastic containers are, however, not completely tight for solvent motor fuel and readily volatile or gaseous substances since slight amounts continuously escape to the outside as a result of permeation. Recently, an effort was, therefore, made to considerably reduce the permeation rates. This can be successfully accomplished by exposing the inside surface of the container for some time to the influence of a fluorine-containing treatment gas. During this process, the surface is coated by elementary fluorine or also in the form of fluorocarbon compounds and fluorocarbonhydrogen compounds. Suitable reaction agents are also chlorofluoride, chlorotrifluoride, bromotrifluoride, fluorosulfonic acid and similar substances. The fluorine-containing layer considerably reduces the permeation rates. When the fluorine-containing treatment gas is used at the same time as blow medium in blow extrusion of containers, we speak of in-linefluorination. On the other hand, the fluorination conducted on already extruded containers is called off-line-fluorination. Such processes are known, for example, from German Patent No. 2 401 948 and German Patent No. 2 644 508. In addition to the in-line single step process according to German Patent No. 2 401 948, German Patent No. 3 523 137 also describes an in-line two step process.

The fluorination of plastic surfaces, however, not only influences the permeation behavior to a large degree but also the abrasion resistance, the chemical, thermal and mechanical strength, the adhesive behavior and the wettability are affected. The invention is, therefore, not only limited to the fluorination of the inside surface of plastic fuel containers. In the fluorination, the polymer surface is exposed to an attack by elementary fluorine. In the simplest case, for example, with polyethylene, an incremental radicalic substitution of the CH-bonds by CF-bonds takes place.

Extensive in-house investigations have shown that, depending on the reaction conditions, very differently structured fluorinated layers are produced. In order to attain certain good and clearly reproducible surface effects for the above cited material behavior, the exact adherence to certain structure parameters of these fluorinate surfaces is extremely important. These are in the first place layer thickness, uniformity of the fluorine coating, distribution of the $CH_2$-groups, $CHF$-groups and $CF_2$-groups and the depth profile.

SUMMARY OF INVENTION

It is, therefore, the objective of the invention to provide an improvement in the barrier properties of fluorinated boundary layers for solvents, motor fuels, readily volatile or gaseous substances.

In accordance with the invention, after the inside surface of the hollow article has cooled off, the inert gas/reaction gas mixture is blown in below the melting point of the thermoplastic material.

THE DRAWINGS

FIGS. 1–4 show scanning electron micrographs of fluorinated HDPE surfaces at various temperatures.

DETAILED DESCRIPTION

Figure 1:
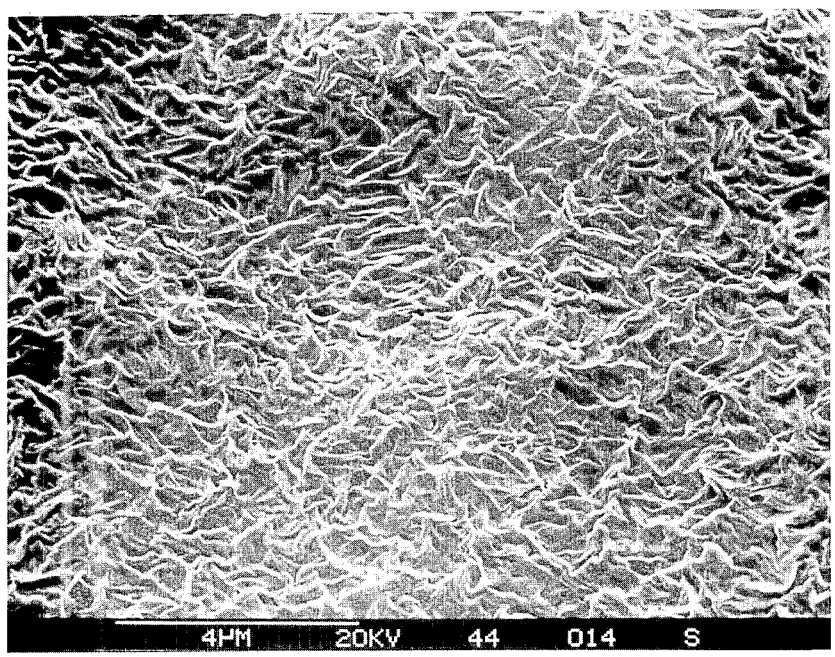
Figure 2:
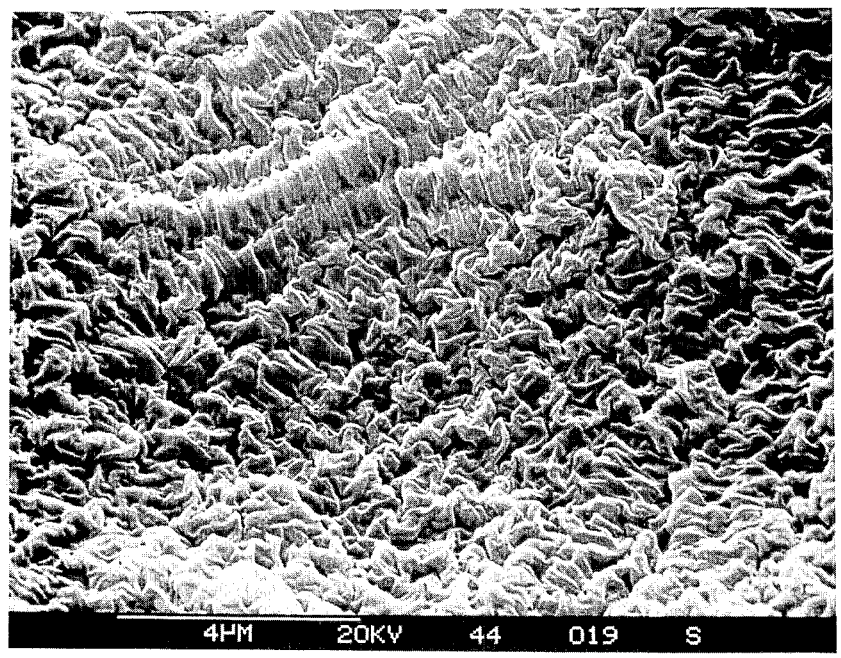
Figure 3:
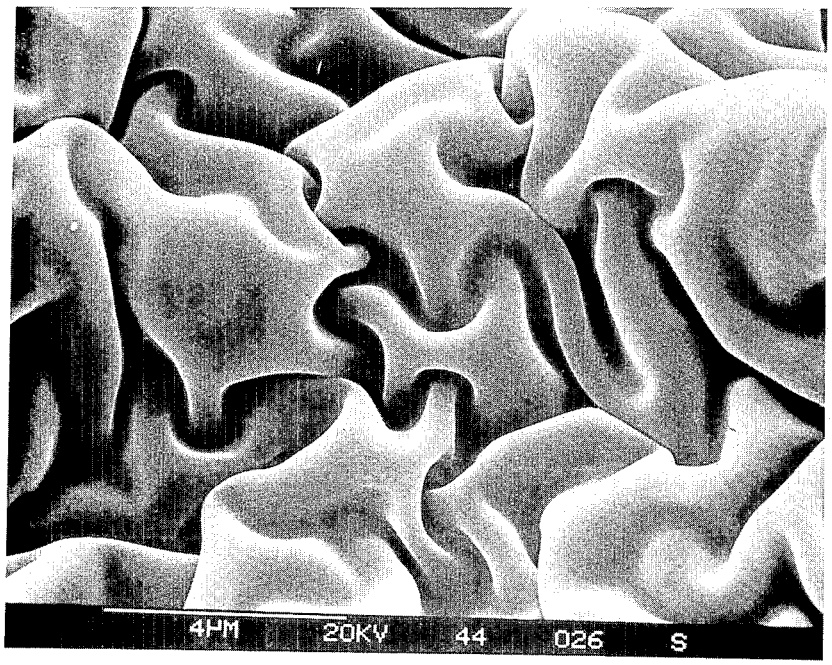
Figure 4:
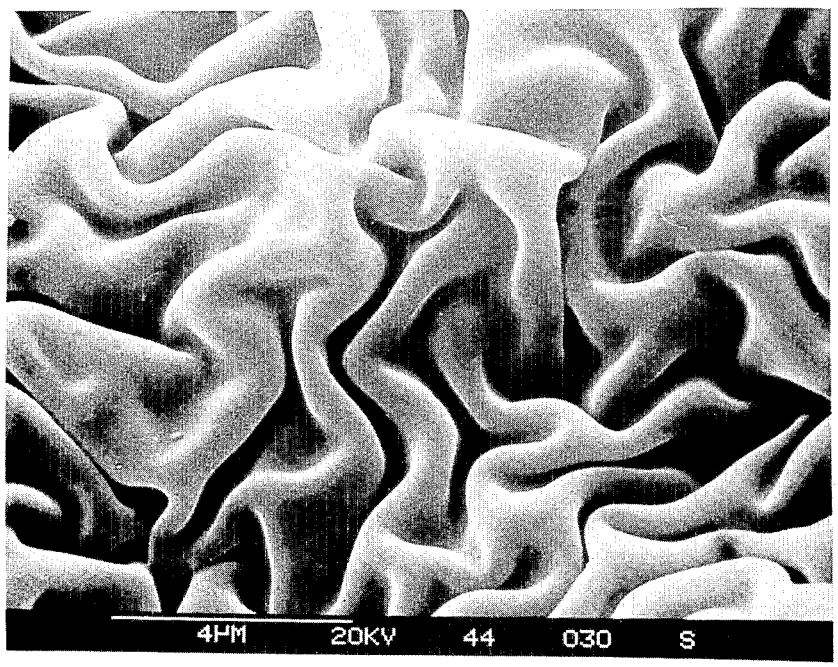

FIGS. 1–4 are scanning electron micrographs (SEM) of HDPE at 10,000 magnification from the inner fluorinated surface for 20 seconds with 9 bar pressure, 1.1% grams of $F_2/N_2$ after flushing with 1 bar $N_2$. The SEM of FIG. 1 is of the surface at 80° C. FIG. 2 is at 120° C. FIG. 3 is at 140° C. FIG. 4 is at 160° C.

Examinations with the scanning electron microscope have shown that a change in surface structure takes place as a function of the surface temperature of the investigated hollow articles. FIGS. 2 and 3 show an example of scanning electron microscope photographs with a 10,000 times enlargement of an HDPE surface at 120° C. and at 140° C.

It was now discovered that the severe wrinkling (FIG. 3) begins at temperatures of the thermoplastic material which are close to or above the melting point. The specific surface is considerably increased by the wrinkled shape and tests have shown that, in spite of the increased fluorine content of the surface to 50–60 $g/cm^2$, the permeation increases with a larger area.

In contrast, it became evident that the specific surface does not increase for a fluorination below the melting temperature. As a result, the normal crystallinity of the thermoplastic material on the surface remains extensively unchanged. The oxidation of the plastic is almost completely limited to the substitution of the H-atoms by fluorine. When attacked by oxidation media, other decomposition reactions of the polymer are prevented by the process temperatures according to the invention. The fluorination in the temperature range of 50° to 130° C., preferably, 80°–120° C. according to the invention, in addition, has the advantage that at these temperatures an almost uniform temperature distribution exists on the inside surface of the hollow article, which allows for a uniform reproducible boundary layer production.

Another advantage of the invention is that, in the temperature range according to the invention, the good morphological structure characteristics of the polymer surface are extensively retained. Polyethylene crystallizes when the melt is cooled. The long molecule chains in this process settle (folded) in very small crystallites. Low pressure polyethylene, also called hard or high density polyethylene attains a crystallinity degree of 60–80%. With an increasing crystallinity, yield stress, modulus of elasticity, stiffness, resistance to solvents and impermeability for gases and vapors increase.

The good property characteristics of an undisturbed solidified (recrystallized) polymer surface are extensively retained since the fluorination reaction does not begin until the crystallites are formed. These differences can be clearly seen in FIGS. 1–4 as well as the crytallites and their cross-links. The surface of FIGS. 3–4 corresponds the most to the conventional surface structure of a container blow-extruded with an inert gas. If the fluorination is conducted at higher surface temperatures, therefore, above the crystallite melting temperature of the employed material, highly folded, amorphous structures having a much larger specific surface are produced after the polymer melt has cooled off.

Example

An HDPE blow type with MF/190/5=0.24 g/min.-,density 0.944–0.948 g/cm, is processed on a blow-machine to plastic fuel containers (Kunststoff-Kraftstoff-Behaltern or KKB). The temperature of the blank is 220° C., blow medium is $N_2$, 10 bar. The blown, dimension stable container having an average wall thickness of 4 mm is then cooled to a temperature of 110° C. by interval purging with $N_2$. Subsequently, a 1.1% $F_2/N_2$-mixture streams into the container until the pressure has increased to 10 bar. After 40 seconds action time, the inert gas/reaction gas mixture is discharged to waste disposal.

A 60 1 plastic fuel container produced in this way has an average fluorine coating of 25 g/cm, and a permeation of 1.5 g/24 hours. The fluorinated inside surface of the plastic fuel container has a mat appearance.

The invention is not limited to the indicated process parameters. The fluorination temperatures depend on the material of the hollow article. The reaction gas fraction can also be varied from 0.5 to 10%. The action time of the reaction gas may vary from 10 to 60 seconds. Next to $N_2$ other inert gases may also be used.

Before the cooling agent is blown in, the pressure inside the hollow article is preferably reduced to 1 to 5 bar. This also applies before the reaction gas mixture is introduced.

Investigations have shown that the invention results in an improved long term stability of the barrier layer. The permeation behavior with respect to polar fuel additives is, furthermore, clearly diminished. An efficient use of fluorine and corresponding reaction agents is, moreover, attained by the process according to the invention.

An especially preferred and advantageous embodiment of the invention is the production of plastic fuel containers consisting of HDPE.

SUMMARY OF INVENTION

The invention relates to a process for blow molding and fluorination of hollow articles, in particular, plastic fuel containers consisting of HDPE. The invention resides in that the fluorination in the in-line process takes place after the hollow article has been produced whereby the temperature of the inside surface of the hollow article lies under the crystallite melting temperature of the employed plastic.

We claim:

1. In a process for blow molding and fluorinating of a hollow article comprising an extruded blank of thermoplastic material, the blank having a temperature exceeding the crystalline melting temperature of the thermoplastic material, is blown against cavity walls of a blow mold as a result of the introduction of an inert blow gas, thereby forming a hollow article with a wrinkled inner surface structure; and then, an inert gas/reaction gas mixture is introduced into the hollow article for the purpose of fluorinating an inside surface of the hollow article, the improvement comprising that upon formation of the hollow article, the inert blow gas pressure is reduced to a pressure which remains above atmospheric pressure and, thereafter, and before the inert gas/reaction gas mixture is introduced, the hollow article is completely blown and self-supporting and is cooled to a temperature below the crystalline melting point of the thermoplastic material by purging with an inert cooling gas; and, after the inside surface of the hollow article has cooled off to a temperature below the crystalline melting point of the thermoplastic material, the pressure of said inert cooling gas is reduced and the inert gas/reaction gas mixture is introduced into the hollow article at a temperature below the crystalline melting point of the thermoplastic material; and, the temperature of the inside surface of the hollow article when the inert gas/reaction gas mixture is introduced is in the range of from 50°–130° C., the temperature of said inert gas/reaction gas mixture and the inside surface temperature of said hollow article at the time said inert gas/reaction gas mixture is introduced are such that the wrinkled inner surface of said hollow article remains extensively unchanged, and a hollow article having a fluorinated inside surface is produced.

2. In the process of claim 1 wherein the thermoplastic material is selected from the group consisting of HDPE, IDPE, PP, EPDM and PVC; the inert gas/reaction gas mixture being introduced at a temperature in the range of from 80°–130° C.; and the purging being by interval purging.

3. In the process of claim 2 wherein the thermoplastic material is HDPE.

* * * * *